US012806975B2

(12) United States Patent
Chen et al.

(10) Patent No.: US 12,806,975 B2
(45) Date of Patent: Nov. 24, 2026

(54) VEHICLE WINDOW ASSEMBLY AND VEHICLE

(71) Applicant: FUYAO GLASS INDUSTRY GROUP CO., LTD., Fuqing (CN)

(72) Inventors: Zhixin Chen, Fuqing (CN); Xueping Chen, Fuqing (CN)

(73) Assignee: FUYAO GLASS INDUSTRY GROUP CO., LTD., Fuqing (CN)

( * ) Notice: Subject to any disclaimer, the term of this patent is extended or adjusted under 35 U.S.C. 154(b) by 165 days.

(21) Appl. No.: 18/971,384

(22) Filed: Dec. 6, 2024

(65) Prior Publication Data

US 2025/0091414 A1 Mar. 20, 2025

Related U.S. Application Data

(63) Continuation of application No. PCT/CN2022/097555, filed on Jun. 8, 2022.

(51) Int. Cl.
*B60K 35/10* (2024.01)
*B60J 1/02* (2006.01)
(Continued)

(52) U.S. Cl.
CPC ............. *B60J 1/2011* (2013.01); *B60K 35/10* (2024.01)

(58) Field of Classification Search
CPC ............. B60R 11/04; B60R 2011/0045; B60R 2011/0082; B60R 2011/0085; B60R 2011/0026; B60J 1/20; B60J 1/02
See application file for complete search history.

(56) References Cited

U.S. PATENT DOCUMENTS 10,144,364 B2 * 12/2018 Furutake .................. G02B 3/02
2015/0015713 A1 * 1/2015 Wang ...................... B60R 11/04
348/148
(Continued)

FOREIGN PATENT DOCUMENTS

CN 106101491 A 11/2016
CN 106476714 A 3/2017
(Continued)

OTHER PUBLICATIONS

Notification of grant of patent right for invention issued in corresponding CN application No. 202280096762.9 dated Jun. 1, 2026.
(Continued)

*Primary Examiner* — Vivek D Koppikar
*Assistant Examiner* — Daniel Guang-Dian Chen
(74) *Attorney, Agent, or Firm* — Scully, Scott, Murphy & Presser, P.C.

(57) ABSTRACT

A vehicle window assembly and a vehicle are provided. The vehicle window assembly includes vehicle window glass and a detection apparatus. The vehicle window glass further defines a through opening in communication with a first surface of the vehicle window glass and a second surface of the vehicle window glass. The detection apparatus includes a light-transmitting plate and a sensor. The detection apparatus is disposed at the through opening and is rotatably connectable to the vehicle. The detection apparatus has a first position and a second position. The detection apparatus is rotatable between the first position and the second position. When the detection apparatus is at the first position, the light-transmitting plate is located inside the vehicle and the sensor does not operate. When the detection apparatus is at the second position, the light-transmitting plate is located outside the vehicle, and the sensor is turned on to perform detection.

20 Claims, 4 Drawing Sheets

(51) Int. Cl.

| | |
|---|---|
| ***B60J 1/20*** | (2006.01) |
| ***B60J 10/70*** | (2016.01) |
| ***B60R 11/00*** | (2006.01) |
| ***B60R 11/04*** | (2006.01) |

(56) References Cited

U.S. PATENT DOCUMENTS

| | | | | |
|---|---|---|---|---|
| 2016/0318457 | A1* | 11/2016 | Nakano | H04N 23/55 |
| 2016/0318458 | A1* | 11/2016 | Wato | H04N 23/51 |
| 2019/0039531 | A1 | 2/2019 | Wilson | |
| 2021/0362653 | A1* | 11/2021 | Beauregard | B60R 1/074 |

FOREIGN PATENT DOCUMENTS

| | | | |
|---|---|---|---|
| CN | 206579640 | U | 10/2017 |
| CN | 108473031 | A | 8/2018 |
| CN | 114228453 | A | 3/2022 |
| DE | 102018105657 | B3 | 8/2019 |
| JP | 2005112052 | A | 4/2005 |
| JP | 2016208466 | A | 12/2016 |
| JP | 2017114471 | A | 6/2017 |
| JP | 2017165608 | A | 9/2017 |
| JP | 2019001318 | A | 1/2019 |
| JP | 2022014372 | A | 1/2022 |
| WO | 2019181112 | A1 | 9/2019 |
| WO | 2022102659 | A1 | 5/2022 |

OTHER PUBLICATIONS

International Search Report dated Feb. 24, 2023 issued in PCT/CN2022/097555.

Extended European Search Report issued in corresponding EP application No. 22928072.2 dated Apr. 9, 2025.

Notice of Reasons for Refusal issued in corresponding JP application No. 2024-571865 dated Oct. 28, 2025.

Request for the Submission of an Opinion issued in corresponding KR Application No. 10-2024-7040808 dated Sep. 14, 2026.

* cited by examiner

VEHICLE WINDOW ASSEMBLY AND VEHICLE

CROSS-REFERENCE TO RELATED APPLICATION(S)

This application is a continuation of International Application No. PCT/CN2022/097555, filed Jun. 8, 2022, the entire disclosure of which is incorporated herein by reference.

TECHNICAL FIELD

This disclosure relates to the field of vehicle accessory technology, and in particular to a vehicle window assembly and a vehicle.

BACKGROUND

With the development and popularity of autonomous driving technologies, more and more on-board sensors are mounted on vehicles. Common on-board sensors include a visible light camera, an infrared camera, a thermal imager, an augmented reality (AR) camera, a millimeter wave radar, a laser radar, and the like. These on-board sensors are generally located inside the vehicle, and need to detect and collect data from the environment outside the vehicle through a windshield. In this way, micro-machining defects such as optical distortion and non-uniform stress distribution of the windshield, and a material bulk defect such as optical signal weaken caused by light reflection and absorption may reduce operation efficiency of the on-board sensor to varying degrees, and even lead to failure.

SUMMARY

In a first aspect, a vehicle window assembly is configured to be mounted on a vehicle. The vehicle window assembly includes vehicle window glass and a detection apparatus. The vehicle window glass has a first surface and a second surface opposite to the first surface. The first surface is configured to face an interior of the vehicle. The second surface is configured to face an exterior of the vehicle. The vehicle window glass further defines a through opening in communication with the first surface and the second surface. The detection apparatus includes a light-transmitting plate and at least one sensor. The at least one sensor is configured to emit and/or receive detection light passing through the light-transmitting plate. The detection apparatus is disposed at the through opening. One end of the detection apparatus away from the light-transmitting plate is rotatably connectable to the vehicle. The detection apparatus has a first position and a second position. The detection apparatus is rotatable between the first position and the second position. When the detection apparatus is at the first position, the light-transmitting plate is located inside the vehicle. When the detection apparatus is at the second position, the light-transmitting plate is located outside the vehicle, and the at least one sensor in the detection apparatus is configured to emit and/or receive the detection light passing through the light-transmitting plate to perform detection.

In a second aspect, a vehicle is further provided in the present disclosure. The vehicle includes a vehicle body and a vehicle window assembly. The vehicle window assembly includes vehicle window glass and a detection apparatus. The vehicle window glass has a first surface and a second surface opposite to the first surface. The first surface faces an interior of the vehicle. The second surface faces an exterior of the vehicle. The vehicle window glass further defines a through opening in communication with the first surface and the second surface. The detection apparatus includes a light-transmitting plate and at least one sensor. The at least one sensor is configured to emit and/or receive detection light passing through the light-transmitting plate. The detection apparatus is disposed at the through opening. One end of the detection apparatus away from the light-transmitting plate is rotatably connectable to the vehicle. The detection apparatus has a first position and a second position. The detection apparatus is rotatable between the first position and the second position. When the detection apparatus is at the first position, the light-transmitting plate is located inside the vehicle. When the detection apparatus is at the second position, the light-transmitting plate is located outside the vehicle, and the at least one sensor in the detection apparatus is configured to emit and/or receive the detection light passing through the light-transmitting plate to perform detection.

Figure 1:
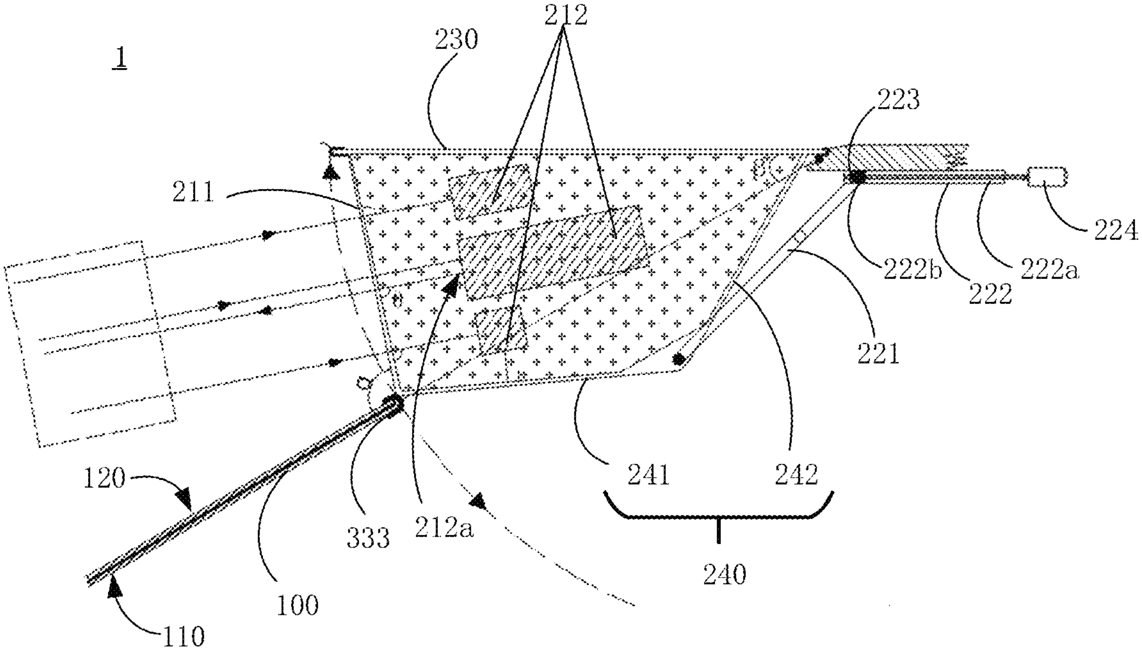
FIG. 1 is a schematic side cross-sectional view of a vehicle window assembly when a detection apparatus is at a second position according to an embodiment of the present disclosure.
Figure 2:
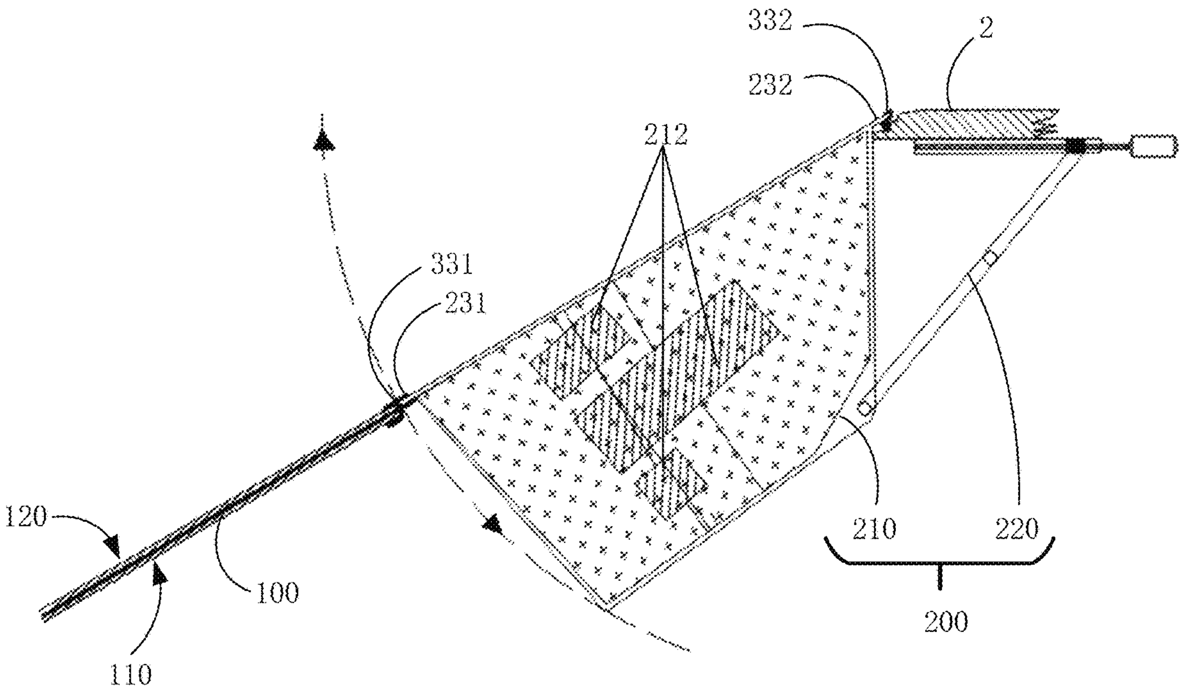
FIG. 2 is a schematic side cross-sectional view of a vehicle window assembly when a detection apparatus is at a first position according to an embodiment of the present disclosure.
Figure 3:
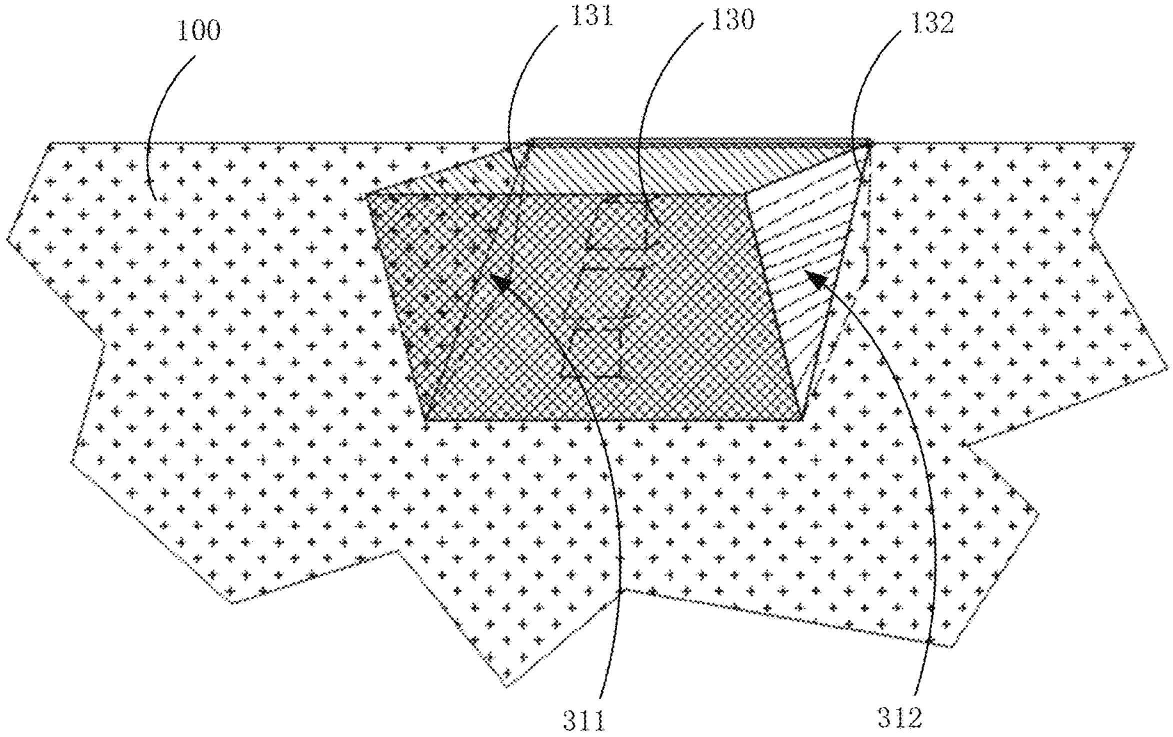
FIG. 3 is a schematic structural view of a detection module according to an embodiment of the present disclosure.
Figure 4:
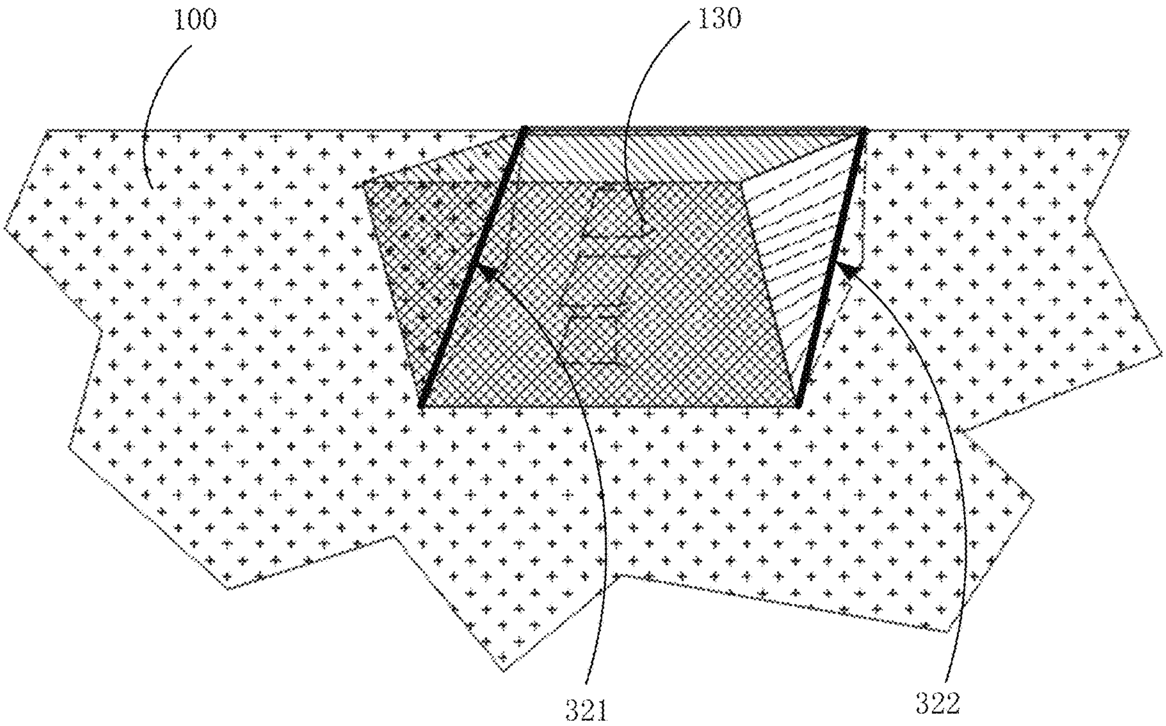
FIG. 4 is a schematic structural view of a detection module according to another embodiment of the present disclosure.

Description of reference signs of the accompanying drawings: 1—vehicle window assembly; 2—vehicle; 3—vehicle body; 100—vehicle window glass; 110—first surface; 120—second surface; 130—through opening; 131—first edge—portion; 132—second edge—portion; 200—detection apparatus; 210—detection module; 211—light—transmitting plate; 212—sensor; 212*a*—sensing end; 220—driving mechanism; 221—support member; 222—rail member; 222*a*—first end; 222*b*—second end; 223—sliding block; 224—driving motor; 230—cover plate; 231—first protrusion; 232—second protrusion; 240—bottom plate; 241—first bottom—plate; 242—second bottom—plate; 311—first sealing curtain; 312—second sealing curtain; 321—first sealing strip; 322—second sealing strip; 331—first cushion; 332—second cushion; 333—third cushion.

DETAILED DESCRIPTION

The technical problem to be solved by the present disclosure is that a traditional windshield is difficult to meet an increasing requirement of an on-board sensor in an autonomous driving vehicle for reducing a micro-machining defect and a material buck defect. To this end, the present disclosure provides a vehicle window assembly and a vehicle.

The technical solution adopted by the present disclosure to solve the technical problem thereof includes the following.

The content of the present disclosure will be further described below with reference to the accompanying drawings.

As illustrated in FIG. 1 to FIG. 4, a vehicle window assembly 1 according to an embodiment of the present disclosure is configured to be mounted on a vehicle 2. The vehicle window assembly 1 includes vehicle window glass 100 and a detection apparatus 200. The vehicle window glass 100 has a first surface 110 and a second surface 120 opposite to the first surface 110. The first surface 110 is configured to face an interior of the vehicle 2. The second surface 120 is configured to face an exterior of the vehicle 2. The vehicle window glass 100 further defines a through opening 130 in communication with the first surface 110 and the second surface 120. The detection apparatus 200 includes a light-transmitting plate 211 and at least one sensor 212. The at least one sensor 212 is configured to emit and/or receive detection light passing through the light-transmitting plate 211. The detection apparatus 200 is disposed at the through opening 130. One end of the detection apparatus 200 away from the light-transmitting plate 211 is rotatably connectable to the vehicle 2. The detection apparatus 200 has a first position and a second position. The detection apparatus 200 is rotatable between the first position and the second position. When the detection apparatus 200 is at the first position, the light-transmitting plate 211 is located inside the vehicle 2. When the detection apparatus 200 is at the second position, the light-transmitting plate 211 is located outside the vehicle 2, and the at least one sensor 212 in the detection apparatus 200 is configured to emit and/or receive the detection light passing through the light-transmitting plate 211 to perform detection.

In an embodiment of the present disclosure, the vehicle window assembly 1 includes the vehicle window glass 100 and the detection apparatus 200. The detection apparatus 200 is rotatable to pass through the through opening 130 on the vehicle window glass 100 back and forth to reach the first position or the second position. When the detection apparatus 200 is at the first position, the light-transmitting plate 211 of the detection apparatus 200 is located inside the vehicle 2, and the at least one sensor 212 in the detection apparatus 200 is in a turn-off state and does not operate. When the detection apparatus 200 is at the second position, the light-transmitting plate 211 of the detection apparatus 200 is located outside the vehicle 2, and the at least one sensor 212 in the detection apparatus 200 is in a turn-on state and operates to detect the external environment of the vehicle 2.

In the vehicle window assembly 1 in the present disclosure, the detection apparatus 200 that can be opened and closed is provided on the vehicle window glass 100 defining the through opening 130, the detection apparatus 200 has an independent light-transmitting plate 211, that is, the light-transmitting plate 211 and the vehicle window glass 100 are independent of each other, and the light-transmitting plate 211 is not affected by the machining defect and bulk defect of the vehicle window glass 100, so that when the vehicle window glass 100 is matched with a sensor 212 with a higher requirement, a higher cost and a more complex machining process are not required. At the same time, for a sensor 212 in the conventional technology, there is a problem of high reflectivity caused by detection light passing through vehicle window glass 100 at a high angle of 50° to 70°. In the present disclosure, the light-transmitting plate 211 and the sensor 212 are designed to keep perpendicular or near-perpendicular to each other, so that detection light emitted and/or received by the sensor 212 that passes through the light-transmitting plate 211 is incident at a small incident angle (≤30°), even at an incident angle close to 0°, thereby reducing reflectivity of the light-transmitting plate 211 for the detection light emitted and/or received by the sensor 212, and improving the transmittance of the detection light passing through the light-transmitting plate 211. When the detection apparatus 200 detects the external environment of the vehicle 2, the detection light emitted and/or received by the sensor 212 directly passes through the light-transmitting plate 211 without passing through the vehicle window glass 100, so that interference of the vehicle window glass 100 on the detection light is avoided, and the detection precision and operation efficiency of the detection apparatus 200 are improved.

It can be understood that the vehicle window assembly 1 is configured to be mounted on the vehicle 2. The first surface 110 of the vehicle window glass 100 is configured to face the interior of the vehicle 2. The second surface 120 is configured to face the exterior of the vehicle 2. The detection apparatus 200 has the first position and the second position. The detection apparatus 200 is rotatable between the first position and the second position. The first position is located inside the vehicle 2 and close to the first surface 110, so that the light-transmitting plate 211 can be located inside the vehicle 2. The second position is located outside the vehicle 2 and close to the second surface 120, so that the light-transmitting plate 211 can be located outside the vehicle 2, and thus the sensor 212 in the detection apparatus 200 can emit detection light passing through the light-transmitting plate 211 to the outside and/or receive detection light passing through the light-transmitting plate 211 from the outside.

Optionally, the vehicle window glass 100 is laminated glass. The laminated glass includes an outer glass plate, an intermediate adhesive layer, and an inner glass plate which are laminated in sequence. The outer glass plate has an outer surface and an inner surface opposite to the outer surface. The outer surface of the outer glass plate serves as the second surface 120 of the vehicle window glass 100. The inner glass plate has an outer surface and an inner surface opposite to the outer surface. The inner surface of the inner glass plate serves as the first surface 110 of the vehicle window glass 100. The intermediate adhesive layer is disposed between the inner surface of the outer glass plate and the outer surface of the inner glass plate.

The outer glass plate and the inner glass plate may be made of at least one of high aluminum, borosilicate, or soda-lime-silicate. The intermediate adhesive layer may be made of at least one of polyvinyl butyral (PVB), ethylene vinyl acetate (EVA), or a sentry glass plus (SGP). The intermediate adhesive layer may have a single-layer structure or a multilayer structure. For example, the multilayer structure includes a double-layer structure, a triple-layer structure, a quadruple-layer structure, a five-layer structure, and the like. The intermediate adhesive layer may also have other functions such as providing at least one colored region as a shadow band to reduce the interference of sunlight to the eyes, or adding an infrared absorber to have a sunscreen or heat insulation function, or adding an ultraviolet absorber to have an ultraviolet insulation function, or at least one layer of the multi-layer structure has a higher plasticizer content to have a sound insulation function.

The laminated glass further includes a thermal insulation coating. Since the laminated glass defines the through opening 130, the thermal insulation coating does not affect the detection light emitted and/or received by the sensor 212. The thermal insulation coating may be disposed on the inner surface of the outer glass plate and/or the outer surface of the inner glass plate. The thermal insulation coating includes at least one metal layer and at least two dielectric layers, and each metal layer is located between two adjacent dielectric layers. Specifically, the thermal insulation coating can be used for insulating external heat from entering the vehicle by reflecting infrared rays outside the vehicle, so that the temperature in the vehicle can be better controlled. It can be understood that in other possible implementations, the thermal insulation coating may also be disposed at other positions of the laminated glass, which is not limited in the present disclosure. In some embodiments, the laminated glass further includes a first bus-bar and a second bus-bar that are electrically connected to the thermal insulation coating. The thermal insulation coating has a heating power density of at least 600 $W/m^2$ between the first bus-bar and the second bus-bar. The first bus-bar and the second bus-bar are electrically connected to the thermal insulation coating, respectively. When the first bus-bar and the second bus-bar are energized, the thermal insulation coating generates heat and can reach the heating power density of at least 600 $W/m^2$. Therefore, the laminated glass 10 is heated to remove frost, fog, ice, snow, etc., so as to ensure a clear visual field of the driver in bad weather.

In some embodiments, the light-transmitting plate 211 has a transmittance greater than or equal to 85% for light in a wavelength range of 780 nm to 1650 nm. Specifically, the transmittance of the light-transmitting plate 211 for light in the wavelength range of 780 nm to 1650 nm may be, but is not limited to, 85%, 86%, 87%, 88%, 89%, 90%, 91%, 92%, 93%, 94%, 95%, 96%, 97%, 98%, 99%. Optionally, when the sensor 212 is a laser radar, in order to ensure good detection effect of the laser radar, the transmittance of the light-transmitting plate 211 for light in the wavelength range of 780 nm to 1650 nm needs to be 85% or more.

In some embodiments, the light-transmitting plate 211 has a visible-light transmittance greater than or equal to 80% for light in a wavelength range of 380 nm to 780 nm. Specifically, the visible-light transmittance of the light-transmitting plate 211 for light in the wavelength range of 380 nm to 780 nm may be, but is not limited to, 80%, 81%, 82%, 83%, 84%, 85%, 86%, 87%, 88%, 89%, 90%, 91%, 92%, 93%, 94%, 95%, 96%, 97%, 98%, 99%. Optionally, when the sensor 212 is a visible light camera, in order to ensure a good detection effect of the visible light camera, the visible-light transmittance of the light-transmitting plate 211 for light in the wavelength range of 380 nm to 780 nm needs to be 80% or more.

In some embodiments, the light-transmitting plate 211 has a diopter less than or equal to 75 mdpt. Specifically, the diopter of the light-transmitting plate 211 may be, but is not limited to, 75 mdpt, 74 mdpt, 73 mdpt, 72 mdpt, 71 mdpt, 70 mdpt, 69 mdpt, 68 mdpt, 67 mdpt, 66 mdpt, 65 mdpt, 60 mdpt, 55 mdpt, 50 mdpt, etc. Optionally, when the sensor 212 is an augmented reality (AR) camera, in order to ensure good detection effect of the AR camera, the diopter of the light-transmitting plate 211 needs to be less than or equal to 70 mdpt.

In some embodiments, the detection apparatus 200 includes a detecting module 210 and a driving mechanism 220. The detecting module 210 includes the light-transmitting plate 211 and the at least one sensor 212. One end of the detection module 210 away from the light-transmitting plate 211 is rotatably connectable to the vehicle 2. The driving mechanism 220 has one end rotatably connected to the detection module 210, and the other end rotatably and slidably connectable to the vehicle 2. The driving mechanism 220 is configured to drive the detection module 210 to switch between the first position and the second position. Optionally, the detection module 210 has the light-transmitting plate 211 and the at least one sensor 212. The end of the detection module 210 away from the light-transmitting plate 211 is rotatably connectable to the vehicle 2. In this way, the light-transmitting plate 211 is rotatable to pass through the through opening 130 back and forth, and the light-transmitting plate 211 can be freely located at the inner side of the first surface 110 or at the outer side of the second surface 120, so that the sensor 212 can be hidden and do not operate, or detect the outside of the vehicle. One end of the driving mechanism 220 is rotatably connected to the detection module 210, and the other end of the driving mechanism 220 is rotatably and slidably connectable to the vehicle 2. The driving mechanism 220 is configured to drive the detecting module 210 to switch between the first position and the second position. One end of the driving mechanism 220 is rotatably connected to the detection module 210, and the other end is rotatably and slidably connectable to the vehicle 2, so that the position of the detection module 210 can be controlled by controlling the movement of the end of the driving mechanism 220 connected to the vehicle 2. Therefore, the detection module 210 to be controllably located at the first position or the second position, so as to complete the opening and closing of the vehicle window assembly 1.

In some embodiments, the driving mechanism 220 includes a rail member 222 and a support member 221. The rail member 222 is configured to be mounted on the vehicle 2. The rail member 222 has a first end **222*a* and a second end 222*b* opposite to the first end 222*a*. The first end 222*a* is farther away from the detection module 210 than the second end 222*b*. The support member 221 has one end rotatably connected to the detection module 210, and the other end that is rotatably connected to the rail member 222 and slidable between the first end 222*a* and the second end 222*b*. When the support member 221 is close to the first end 222*a*, the detection module 210 is at the first position. When the support member 221 is close to the second end 222*b*, the detection module 210 is at the second position. Optionally, in the present disclosure, by driving the movement of the support member 221 on the rail member 222, the driving mechanism 220 can drive the detection module 210 to switch between the first position and the second position. Specifically, the support member 221 is rotatably connected to one end of the rail member 222, and is slidable between the first end 222*a* and the second end 222*b* of the rail member 222. In order to enable a sliding state to be converted by the support member 221, the support member 221 is rotatably connected to one end of the detection module 210, and the detection module 210 can be driven to rotate, so that the detection module 210 is at the first position or the second position. Therefore, the detection module 210 can be driven to rotate by means of a linear movement of the driving mechanism 220, which is beneficial to the overall controllability of the detection module 210**.

In some embodiments, when the detection module 210 is switched from the first position to the second position, the support member 221 slides from the first end **222*a* towards the second end 222*b*, the end of the support member 221 away from the rail member 222 pushes the detection module 210 to rotate in a direction away from the vehicle window glass 100, so that the light-transmitting plate 211 is located at the outer side of the second surface 120 of the vehicle window glass 100. When the detection module 210 is switched from the second position to the first position, the support member 221 slides from the second end 222***b* towards the first end 222*a*, and the end of the support member 221 away from the rail member 222 drives the detection module 210 to rotate in a direction close to the vehicle window glass 100, so that the light-transmitting plate 211 is located at the inner side of the first surface 110 of the vehicle window glass 100.

Optionally, the support member 221 is rod-shaped.

Optionally, two ends of the support member 221 are respectively rotatably connected to the detection module 210 and the rail member 222. One end of the support member 221 is slidably and rotatably connected to the rail member 222. When the detection module 210 is switched from the first position to the second position by means of rotation, one end of the support member 221 connected to the rail member 222 slides from the first end 222*a* of the rail member 222 towards the second end 222*b* of the rail member 222. In this process, the detection module 210 rotates in a direction away from the vehicle window glass 100 and passes through the through opening 130, so that the light-transmitting plate 211 moves to the outer side of the second surface 120. When the detection module 210 is switched from the second position to the first position by means of rotation, one end of the support member 221 connected to the rail member 222 slides from the second end 222*b* of the rail member 222 towards the first end 222*a* of the rail member 222. In this process, the detection module 210 rotates in a direction close to the vehicle window glass 100 and passes through the through opening 130, so that the light-transmitting plate 211 moves to the inner side of the first surface 110.

In some embodiments, the driving mechanism 220 further includes a sliding block 223. The sliding block 223 is connected to the rail member 222 and is slidable between the first end 222*a* and the second end 222*b*. The support member 221 is rotatably connected to the sliding block 223 to be rotatably connected to the rail member 222 through the sliding block 223 to be slidable between the first end 222*a* and the second end 222*b*. Optionally, the sliding block 223 is connected to the rail member 222 and slidable between the first end 222*a* and the second end 222*b*. One end of the support member 221 close to the rail member 222 is rotatably connected to the sliding block 223. In other words, one end of the support member 221 close to the rail member 222 is connected to the rail member 222 through the sliding block 223. By means of the connection between the support member 221 and the sliding block 223, the movement of the support member 221 can be conveniently controlled by controlling the movement of the sliding block 223, thereby facilitating the control of the movement condition of the detection module 210.

In some embodiments, the driving mechanism 220 further includes a driving motor 224. The driving motor 224 is connected to the sliding block 223, so as to drive the sliding block 223 to slide between the first end 222*a* and the second end 222*b*. Optionally, the driving motor 224 is configured to provide kinetic energy for the sliding block 223. The driving motor 224 is connected to the sliding block 223. By applying a driving force to the sliding block 223, the force is transferred to the support member 221 through the sliding block 223, and then the force is applied to the detection module 210, so that the detection module 210 is switched between the first position and the second position.

In some embodiments, the driving mechanism 220 further includes a threaded rod disposed at a power output shaft of the driving motor 224. The sliding block 223 is sleeved on the threaded rod. An extension direction of the threaded rod is parallel to an extension direction of the rail member 222. At least a part of the sliding block 223 is snapped into the rail member 222. The threaded rod is driven to rotate by the power output shaft of the driving motor 224. The threaded rod is provided with a thread on an outer wall of the threaded rod, and the sliding block 223 is provided with a matching thread at a connection of the sliding block 223 and the rail member 222. When the threaded rod rotates, the sliding block 223 is limited by the rail member 222, and the sliding block 223 is driven by means of the rotation of the thread to move along the threaded rod, so that the sliding block 223 is slid in the extension direction of the rail member 222. In other words, the sliding block 223 is moved between the first end 222*a* of the rail member 222 and the second end 222*b* of the rail member 222.

In some embodiments, there is at least one group of driving mechanisms 220.

In some embodiments, the driving mechanism 220 includes at least two support members 221.

In some embodiments, the detection module 210 further includes a cover plate 230 and a bottom plate 240. The cover plate 230 is connected to the light-transmitting plate 211. The bottom plate 240 has one end connected to one end of the light-transmitting plate 211 away from the cover plate 230, and the other end connected to one end of the cover plate 230 away from the light-transmitting plate 211. The cover plate 230, the light-transmitting plate 211, and the bottom plate 240 cooperatively define an accommodating space. The at least one sensor 212 is accommodated in the accommodating space. The at least one sensor 212 each has a sensing end 212*a* facing the light-transmitting plate 211. The bottom plate 240 includes a first bottom-plate 241 and a second bottom-plate 242 that are connected in a bent manner. One end of the first bottom-plate 241 away from the second bottom-plate 242 is connected to the light-transmitting plate 211. One end of the second bottom-plate 242 away from the first bottom-plate 241 is connected to the cover plate 230 and rotatably connectable to the vehicle 2. One end of the second bottom-plate 242 close to the first bottom-plate 241 is rotatably connected to one end of the support member 221 away from the rail member 222. Optionally, the cover plate 230, the light-transmitting plate 211, and the bottom plate 240 cooperatively defines the accommodating space. The at least one sensor 212 is accommodated in the accommodating space. The at least one sensor 212 is supported and protected by means of the accommodating space. In other words, the at least one sensor 212 is fixed to the cover plate 230 and/or the bottom plate 240. The sensing end 212*a* of each sensor 212 faces the light-transmitting plate 211, and is used for detecting the external environment, thereby detecting accurate data such as position, distance, etc.

Optionally, there are at least two sensors 212.

Optionally, the sensor 212 is at least one of a visible light camera, an infrared camera, a thermal imager, an AR camera, a millimeter wave radar, and a laser radar.

In some embodiments, when the detection module 210 is at the first position, one end of the light-transmitting plate 211 close to the cover plate 230 abuts against the vehicle window glass 100. When the detection module 210 is at the second position, the end of the light-transmitting plate 211 away from the cover plate 230 abuts against the vehicle window glass 100. Specifically, when the vehicle 2 is equipped with the vehicle window assembly 1 and the detection module 210 is at the first position, the end of the light-transmitting plate 211 close to the cover plate 230 abuts against the vehicle window glass 100, so that the interior environment of the vehicle can be sealed, thereby being waterproof, windproof, and noise-reducing. When the detection module 210 is at the second position, the end of the light-transmitting plate 211 away from the cover plate 230 abuts against the vehicle window glass 100, so that the interior environment of the vehicle can be sealed, and wind and rain are prevented from entering the interior of the vehicle 2 through a gap between the end of the light-transmitting plate 211 away from the cover plate 230 and the vehicle window glass 100 when the vehicle 2 moves.

In some embodiments, when the detection module 210 is switched from the first position to the second position, the end of the support member 221 connected to the rail member 222 slides from the first end **222*a* towards the second end 222*b*, and the end of the support member 221 away from the rail member 222 pushes the second bottom-plate 242 to rotate in the direction close to the vehicle window glass 100, so that the light-transmitting plate 211 is located at the outer side of the second surface 120 of the vehicle window glass 100. When the detection module 210 is switched from the second position to the first position, the end of the support member 221 connected to the rail member 222 slides from the second end 222*b* towards the first end 222*a*, the end of the support member 221 away from the rail member 222 drives the second bottom-plate 242 to rotate in the direction away from the vehicle window glass 100, so that the light-transmitting plate 211 is located at the inner side of the first surface 110 of the vehicle window glass 100**.

Optionally, two ends of the support member 221 are respectively rotatably connected to the bottom plate 240 and the rail member 222. One end of the support member 221 is slidably and rotatably connected to the rail member 222. When the detection module 210 is switched from the first position to the second position by means of rotation, one end of the support member 221 connected to the rail member 222 slides from the first end **222*a* of the rail member 222 to the second end 222*b* of the rail member 222. In this process, driven by the support member 221, one end of the support member 221 connected to the bottom plate 240 moves in a direction close to the vehicle window glass 100, and the detection module 210 is rotatably connectable to the vehicle 2, so that the detection module 210 rotates in the direction away from the vehicle window glass 100 and passes through the through opening 130, and then the detection module 210 reaches the second position. When the detection module 210 is switched from the second position to the first position by means of rotation, one end of the support member 221 connected to the rail member 222 slides from the second end 222*b* of the rail member 222 towards the first end 222*a* of the rail member 222. In this process, driven by the support member 221, the end of the support member 221 connected to the bottom plate 240 moves in the direction away from the vehicle window glass 100, and the detection module 210 is rotatably connectable to the vehicle 2, so that the detection module 210 rotates in the direction close to the vehicle window glass 100 and passes through the through opening 130, and then the detection module 210 reaches the first position. By providing the bottom plate 240, the support member 221 is connected to the bottom plate 240, so that the detection module 210 can be driven to move, thereby controlling the position of the sensor 212. Therefore, a problem of unstable position of the sensor 212 caused by directly moving the sensor 212 and/or the light-transmitting plate 211** can be avoided.

In some embodiments, when the detection apparatus 200 is at the second position, an angle $\alpha$ between the vehicle window glass 100 and the light-transmitting plate 211 ranges from 60° to 150°. Optionally, the angle $\alpha$ between the vehicle window glass 100 and the light-transmitting plate 211 may be, but is not limited to, 60°, 65°, 70°, 75°, 80°, 85°, 90°, 95°, 100°, 105°, 110°, 115°, 120°, 125°, 130°, 135°, 145°, 150°. When the angle $\alpha$ between the light-transmitting plate 211 and the vehicle window glass 100 is less than 60° or greater than 150°, in order to ensure that the sensor 212 can detect the external environment of the forward visual field of the vehicle 2, it is difficult for the detection light emitted and/or received by the sensor 212 to pass through the light-transmitting plate 211 at a small incident angle (≤30°) or even an incident angle close to 0°.

In some embodiments, when the detection apparatus 200 is at the second position, the angle $\alpha$ between the vehicle window glass 100 and the light-transmitting plate 211 ranges from 90° to 120°. After the vehicle window glass 100 is mounted on the vehicle 2 as a windshield, taking into account a mounted angle at which the windshield is mounted inclinedly, when the angle $\alpha$ between the vehicle window glass 100 and the light-transmitting plate 211 ranges from 90° to 120°, the sensor 212 can be better assembled with the light-transmitting plate 211, so that the detection light emitted and/or received by the sensor 212 can pass through the light-transmitting plate 211 at a small incident angle (≤30°) or even at an incident angle close to 0°.

In some embodiments, when the detection module 210 is at the first position, the cover plate 230 is parallel to the vehicle window glass 100. When the detection module 210 is at the second position, an angle $\beta$ between the cover plate 230 and the vehicle window glass 100 ranges from 20° to 45°.

Optionally, when no detection by the detection apparatus 200 is required during stationariness or movement of the vehicle 2, the detection module 210 is at the first position, the cover plate 230 is parallel to the vehicle window glass 100, and the cover plate 230 abuts against to the vehicle window glass 100. In this case, the cover plate 230 covers the through opening 130, so as to seal the vehicle window glass 100 and protect the detection apparatus 200. Preferably, when the detection module 210 is at the first position, an outer surface of the cover plate 230 is flush or substantially flush with the second surface 120 of the vehicle window glass 100, so as to ensure that the vehicle window assembly 1 has an integrated appearance. Considering that the vehicle window glass 100 is generally curved, a certain angle may be defined between the cover plate 230 and the vehicle window glass 100, for example, the angle between the cover plate 230 and the vehicle window glass 100 ranges from 0° to 10°, preferably 0° to 5°, and more preferably 0° to 3°.

Optionally, when detection by the detection apparatus 200 is required during movement or stationariness of the vehicle 2, the detection apparatus 200 is at the second position, and the angle $\beta$ between the cover plate 230 and the vehicle window glass 100 may be, but is not limited to, 20°, 22°, 24°, 26°, 28°, 30°, 32°, 34°, 36°, 38°, 40°, 42°, 44°, 45°. When the angle $\beta$ between the cover plate 230 and the vehicle window glass 100 is less than 20°, the length of the light-transmitting plate 211 in the vertical direction is too small, which causes the detection visual field of the sensor 212 to be too narrow and affects the detection effect. When the angle $\beta$ between the cover plate 230 and the vehicle window glass 100 is greater than 45°, the length of the light-transmitting plate 211 in the vertical direction is too large, resulting in larger wind resistance and wind noise when the vehicle 2 is equipped with the vehicle window assembly 1 and the vehicle 2 moves.

In some embodiments, when the detection apparatus 200 is at the second position, an angle θ between the light-transmitting plate 211 and the detection light emitted and/or received by the sensor 212 ranges from 60° to 120°, so that the detection light emitted and/or received by the sensor 212 passes through the light-transmitting plate 211 at a small incident angle less than or equal to 30°. Optionally, the angle θ between the light-transmitting plate 211 and the detection light emitted and/or received by the sensor 212 may be, but is not limited to, 60°, 65°, 70°, 75°, 80°, 85°, 90°, 95°, 100°, 105°, 110°, 115°, 120°. When the angle θ between the light-transmitting plate 211 and the detection light emitted and/or received by the sensor 212 is less than 60° or greater than 120°, according to Fresnel's Law, the detection light emitted and/or received by the sensor 212 are seriously reflected on the surface of the light-transmitting plate 211, causing serious attenuation when the detection light passes through the light-transmitting plate 211, thereby reducing the detection precision and detection distance of the sensor 212. In other words, the angle θ between the light-transmitting plate 211 and the detection light emitted and/or received by the sensor 212 has a value range of 90°+30°, so that the detection light emitted and/or received by the sensor 212 to pass through the light-transmitting plate 211 at a small incident less than or equal to 30°. When the angle θ is closer to 90°, the detection light emitted and/or received by the sensor 212 is less weakened, and the detection precision of the sensor 212 is higher. When the vehicle window assembly 1 is mounted on the vehicle 2, an angle between the detection light emitted and/or received by the sensor 212 and the horizontal plane ranges from 0° to 5°. Specifically, the angle between the detection light emitted and/or received by the sensor 212 and the horizontal plane may be, but is not limited to, 0°, 1°, 2°, 3°, 4°, 5°. In the present disclosure, there are usually multiple rays of detection light emitted and/or received by the sensor 212, and the angle related to the detection light is measured based on a central ray of the detection light.

In some embodiments, when the detection apparatus 200 is at the second position, the angle θ between the light-transmitting plate 211 and the detection light emitted and/or received by the sensor 212 ranges from 70° to 110°, so that the detection light emitted and/or received by the sensor 212 passes through the light-transmitting plate 211 at a small incident angle less than or equal to 20°.

In some embodiments, when the detection apparatus 200 is at the second position, the angle θ between the light-transmitting plate 211 and the detection light emitted and/or received by the sensor 212 ranges from 80° to 100°, so that the detection light emitted and/or received by the sensor 212 passes through the light-transmitting plate 211 at a small incident angle less than or equal to 10°.

In some embodiments, the detection module 210 further includes a first sealing curtain 311 and a second sealing curtain 312 opposite to the first sealing curtain 311. The first sealing curtain 311 is connected to at least the cover plate 230, the light-transmitting plate 211, and a first edge-portion 131 of the through opening 130 close to the cover plate 230 and the light-transmitting plate 211. The second sealing curtain 312 is connected to at least the cover plate 230, the light-transmitting plate 211, and a second edge-portion 132 of the through opening 130 close to the cover plate 230 and the light-transmitting plate 211. The through opening 130 is cooperatively sealed by the first sealing curtain 311, the second sealing curtain 312, the cover plate 230, and the light-transmitting plate 211 to seal the vehicle 2 when the detection module 210 is at the second position.

Optionally, the first sealing curtain 311 and the second sealing curtain 312 can be unfolded and folded. The accommodating space cooperatively defined by the cover plate 230, the light-transmitting plate 211, and the bottom plate 240 has an opening at each of two opposite sides of the accommodating space. The first sealing curtain 311 and the second sealing curtain 312 are respectively disposed at the two opposite sides of the accommodating space cooperatively defined by the cover plate 230, the light-transmitting plate 211, and the bottom plate 240. The first sealing curtain 311 and the second sealing curtain 312 are used for sealing the openings at the two opposite sides of the accommodating space, so as to define the enclosed space. When the detection module 210 is at the first position, the cover plate 230 covers the through opening 130 and is attached to the vehicle window glass 100, the first sealing curtain 311 and the second sealing curtain 312 are folded to seal gaps between the cover plate 230 and the vehicle window glass 100. Specifically, the gaps are respectively located at two sides of the light-transmitting plate 211, and the first sealing curtain 311 folded and the second sealing curtain 312 folded fill the gaps, thereby being waterproof, windproof, dustproof, and noise-reducing for the vehicle 2. When the detection module 210 is at the second position, the first sealing curtain 311 and the second sealing curtain 312 are unfolded, and the through opening 130 are cooperatively sealed by the first sealing curtain 311, the second sealing curtain 312, the cover plate 230, and the light-transmitting plate 211 to seal the vehicle 2, thereby being waterproof, windproof, dustproof, and noise-reducing for the vehicle 2.

In some embodiments, the detection module 210 further includes a first sealing curtain 311, a second sealing curtain 312, a first sealing strip 321, and a second sealing strip 322. The first sealing curtain 311 and the second sealing curtain 312 are opposite to each other. The first sealing curtain 311 is connected to at least the cover plate 230, the light-transmitting plate 211, and the bottom plate 240. The second sealing curtain 312 is connected to at least the cover plate 230, the light-transmitting plate 211, and the bottom plate 240. The first sealing curtain 311, the second sealing curtain 312, the cover plate 230, the light-transmitting plate 211, and the bottom plate 240 cooperatively define an enclosed space. The first sealing strip 321 is disposed at a first edge-portion 131 of the through opening 130 closed to the first sealing curtain 311. The second sealing strip 322 is disposed at a second edge-portion 132 of the through opening 130 and is close to the second sealing curtain 312. The first sealing strip 321 and the second sealing strip 322 are configured to seal the vehicle 2.

Optionally, the accommodating space cooperatively defined by the cover plate 230, the light-transmitting plate 211, and the bottom plate 240 has an opening at each of two opposite sides of the accommodating space. The first sealing curtain 311 and the second sealing curtain 312 are respectively disposed at the two opposite sides of the accommodating space cooperatively defined by the cover plate 230, the light-transmitting plate 211, and the bottom plate 240. The first sealing curtain 311 and the second sealing curtain 312 are used for sealing the openings at the two opposite side of the accommodating space, so as to define the enclosed space. The first sealing strip 321 is disposed at the first edge-portion 131 of the through opening 130 and is close to the first sealing curtain 311. The first sealing strip 321 abuts against the first sealing curtain 311 to seal the vehicle 2. The second sealing strip 322 is disposed at the second edge-portion 132 of the through opening 130 and is close to the second sealing curtain 312. The second sealing strip 322 abuts against the second sealing curtain 312 to seal the vehicle 2. When the detection module 210 is at the first position, the cover plate 230 covers the through opening 130 and is attached to the vehicle window glass 100, and the first sealing strip 321 and the second sealing strip 322 are configured to seal gaps between the cover plate 230 and the vehicle window glass 100. Specifically, the gaps are respectively located at two sides of the light-transmitting plate 211, and the first sealing strip 321 and the second sealing strip 322 fill the gaps, thereby being waterproof, windproof, dustproof, and noise-reducing for the vehicle 2. When the detection module 210 is at the second position, the first sealing strip 321 abuts against the first sealing curtain 311, and the second sealing strip 322 abuts against the second sealing curtain 312, so as to seal the vehicle 2, thereby being waterproof, windproof, dustproof, and noise-reducing for the vehicle 2.

In some embodiments, the cover plate 230 includes a first protrusion 231 and a second protrusion 232. The first protrusion 231 exceeds the light-transmitting plate 211 in an extension direction of the cover plate 230. The second protrusion 232 exceeds the bottom plate 240 in the extension direction of the cover plate 230. The first protrusion 231 is configured to seal a gap between the light-transmitting plate 211 and the vehicle window glass 100 when the detection module 210 is at the first position. The second protrusion 232 is configured to seal a gap between the bottom plate 240 and the vehicle 2. Optionally, an area of the cover plate 230 is larger than an area of the through opening 130, so that the cover plate 230 covers the through opening 130. By means of the first protrusion 231, the cover plate 230 can cover the gap between the light-transmitting plate 211 and the vehicle window glass 100. By means of the second protrusion 232, the cover plate 230 can cover the gap between the bottom plate 240 and the vehicle 2. When the vehicle window assembly 1 is mounted on the vehicle 2, the cover plate 230 is used for protecting the vehicle 2 from water, wind, dust, and noise.

In some embodiments, the vehicle window assembly 1 further includes a first cushion 331 and a second cushion 332. The first cushion 331 is disposed between the first protrusion 231 and the vehicle window glass 100. When the detection module 210 is at the first position, the first cushion 331 is configured to seal a gap between the cover plate 230 and the vehicle window glass 100. The second cushion 332 is configured to be disposed between the second protrusion 232 and the vehicle 2. The second cushion 332 is configured to seal a gap between the cover plate 230 and the vehicle 2.

Optionally, when the first protrusion 231 seals the gap between the light-transmitting plate 211 and the vehicle window glass 100, a new gap appears between the first protrusion 231 and the vehicle window glass 100. The first cushion 331 is disposed between the first protrusion 231 and the vehicle window glass 100, and can be used for sealing the gap between first protrusion 231 and the vehicle window glass 100. When the second protrusion 232 seals the gap between the bottom plate 240 and the vehicle 2, a new gap appears between the second protrusion 232 and the vehicle 2. The second cushion 332 is disposed between the second protrusion 232 and the vehicle 2, and can be used for sealing the gap between the second protrusion 232 and the vehicle 2. When the vehicle window assembly 1 is mounted on the vehicle 2, the first cushion 331 and the second cushion 332 can improve the sealing performance of the vehicle 2, thereby being waterproof, windproof, dustproof, and noise-reducing when the vehicle 2 moves.

In some embodiments, the vehicle window assembly 1 further includes a third cushion 333. The third cushion 333 is disposed at one side of the vehicle window glass 100 close to the light-transmitting plate 211. When the detection module 210 is at the first position, the third cushion 333 abuts against the first cushion 331 to seal the gap between the cover plate 230 and the vehicle window glass 100. When the detection module 210 is at the second position, the third cushion 333 abuts against the end of the light-transmitting plate 211 away from the cover plate 230 to seal the gap between the light-transmitting plate 211 and the vehicle window glass 100.

Optionally, when the detection module 210 is at the first position, the third cushion 333 and the first cushion 331 cooperate with each other, thereby further improving the sealing performance between the cover plate 230 and the vehicle window glass 100, and better protecting the interior of the vehicle from wind, rain, and noise. When the detection module 210 is at the second position, the third cushion 333 is located between the light-transmitting plate 211 and the vehicle window glass 100, and fills the gap between the light-transmitting plate 211 and the vehicle window glass 100. On condition that the vehicle window assembly 1 is mounted on the vehicle 2, when the vehicle 2 is travelling and the detection module 210 is at the second position, there is a large air impact between the light-transmitting plate 211 and the vehicle window glass 100. Therefore, in order to prevent a high-speed airflow from entering the interior of the vehicle 2, and the gap between the light-transmitting plate 211 and the vehicle window glass 100 is sealed by the third cushion 333.

Optionally, the third cushion 333 is disposed at one side of the light-transmitting plate 211 away from the cover plate 230. When the detection module 210 is at the second position, the third cushion 333 abuts against the vehicle window glass 100 to seal the gap between the light-transmitting plate 211 and the vehicle window glass 100.

In some embodiments, the cover plate 230 is at least one of a polycarbonate plate, organic glass, a polyurethane elastomer plate, a polyvinyl chloride plate, high-aluminum glass, borosilicate glass, and soda-lime-silicate glass.

In some embodiments, the cover plate 230 is provided with a black masking layer. A visible-light transmittance of the cover plate 230 is less than or equal to 2%. Specifically, the visible-light transmittance of the cover plate 230 may be, but is not limited to, 0%, 0.2%, 0.4%, 0.6%, 0.8%, 1%, 1.2%, 1.4%, 1.6%, 1.8%, and 2%.

In some embodiments, the light-transmitting plate 211 is at least one of a polycarbonate plate, organic glass, a polyurethane elastomer plate, a polyvinyl chloride plate, high-aluminum glass, borosilicate glass, and soda-lime-silicate glass.

In some embodiments, a near infrared light transmittance of the light-transmitting plate 211 ranges from 90% to 96% for light in a wavelength range of 800 nm to 1600 nm. Specifically, the near infrared light transmittance of the light-transmitting plate 211 for light in the wavelength range of 800 nm to 1600 nm may be, but is not limited to, 90%, 91.5%, 92%, 92.5%, 93%, 93.5%, 94%, 94.5%, 95%, 95.5%, 96%.

Figure 5:
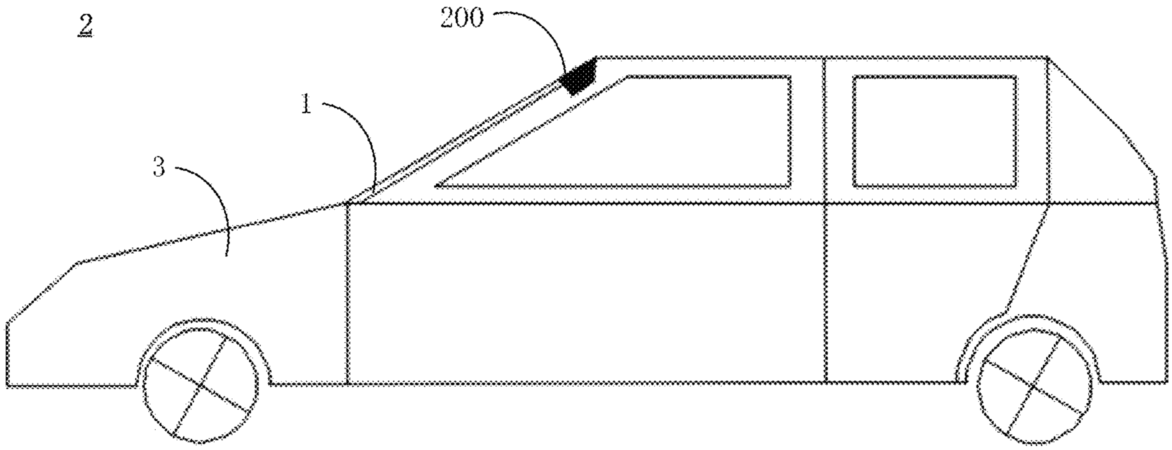
FIG. 5 is a schematic structural view of a stationary vehicle according to an embodiment of the present disclosure.
Figure 6:
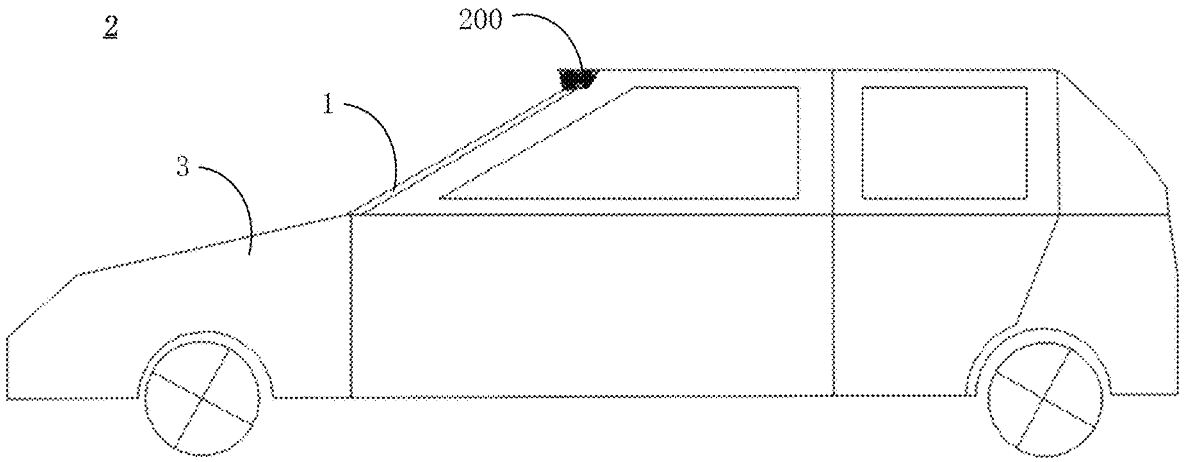
FIG. 6 is a schematic structural view of a moving vehicle according to an embodiment of the present disclosure.

As illustrated in FIG. 5 and FIG. 6, a vehicle 2 is further provided in the present disclosure. The vehicle 2 includes a vehicle body 3 and the vehicle window assembly 1 in the present disclosure. When the detection apparatus 200 is at the first position, the light-transmitting plate 211 is located inside the vehicle 2. When the detection apparatus 200 is at the second position, the light-transmitting plate 211 is located outside the vehicle 2, and the at least one sensor 212 in the detection apparatus 200 is configured to emit and/or receive the detection light passing through the light-transmitting plate 211 to perform detection.

The vehicle 2 in the embodiment of the present disclosure is equipped with the vehicle window assembly 1 in the present disclosure. When no detection by the detection apparatus 200 is required during stationariness or movement of the vehicle 2, the detection apparatus 200 is at the first position, the light-transmitting plate 211 of the detection apparatus 200 is located inside the vehicle 2, and the sensor 212 in the detection apparatus 200 is in the turn-off state. In this case, the sensor 212 does not operate, the cover plate 230 is substantially flush with the second surface 120 of the vehicle window glass 100, and the cover plate 230 abuts against the vehicle window glass 100 and covers the through opening 130, so that the vehicle window glass 100 is sealed and the detection apparatus 200 is protected. When detection by the detection apparatus 200 is required during stationariness or movement of the vehicle 2, the detection apparatus 200 is at the second position, the light-transmitting plate 211 of the detection apparatus 200 is located outside the vehicle 2, and the sensor 212 in the detection apparatus 200 is in the turn-on state. In this case, the sensor 212 operates to detect the external environment of the vehicle 2. When the detection apparatus 200 in the vehicle 2 of the present disclosure detects the external environment of the vehicle 2, the detection light emitted and/or received by the sensor 212 can directly pass through the light-transmitting plate 211 without passing through the vehicle window glass 100 to detect the external environment, so that the interference of the vehicle window glass 100 on the detection light is avoided, and the detection precision and operation efficiency of the sensor 212 are improved, thereby enabling the vehicle 2 to obtain a more reliable data model. The vehicle 2 in the present disclosure may be, but is not limited to, a sedan, a multi-purpose vehicle (MPV), a sports/suburban utility vehicle (SUV), an off-road vehicle (ORV), a pickup, a van, a bus, a truck, and the like.

The above content describes the vehicle window assembly and the vehicle in the present disclosure in detail, but the present disclosure is not limited to the specific embodiments described above. Therefore, any improvement, and equivalent modification and replacement according to the technical point of the present disclosure belong to the scope of protection of the present disclosure.

What is claimed is:

1. A vehicle window assembly configured to be mounted on a vehicle, comprising:

a vehicle window glass having a first surface and a second surface opposite to the first surface, wherein the first surface is configured to face an interior of the vehicle, and the second surface is configured to face an exterior of the vehicle, and the vehicle window glass further defines a through opening in communication with the first surface and the second surface; and a detection apparatus comprising a light-transmitting plate and at least one sensor, wherein the at least one sensor is configured to emit and/or receive detection light passing through the light-transmitting plate; the detection apparatus is disposed at the through opening, and one end of the detection apparatus away from the light-transmitting plate is configured to be rotatably connectable to the vehicle; and the detection apparatus has a first position and a second position, and the detection apparatus is rotatable between the first position and the second position; wherein when the detection apparatus is at the first position, the light-transmitting plate is configured to be located inside the vehicle; and when the detection apparatus is at the second position, the light-transmitting plate is configured to be located outside the vehicle, and the at least one sensor in the detection apparatus is configured to emit and/or receive the detection light passing through the light-transmitting plate to perform detection.

2. The vehicle window assembly of claim 1, wherein the light-transmitting plate has a transmittance greater than or equal to 85% for light in a wavelength range of 780 nm to 1650 nm.

3. The vehicle window assembly of claim 1, wherein the light-transmitting plate has a visible-light transmittance greater than or equal to 80% for light in a wavelength range of 380 nm to 780 nm.

4. The vehicle window assembly of claim 1, wherein the light-transmitting plate has a diopter less than or equal to 75 mdpt.

5. The vehicle window assembly of claim 1, wherein the detection apparatus comprises a detection module and a driving mechanism, the detection module comprises the light-transmitting plate and the at least one sensor; one end of the detection module away from the light-transmitting plate is configured to be rotatably connectable to the vehicle; the driving mechanism has one end rotatably connected to the detection module, and the other end is configured to be rotatably and slidably connectable to the vehicle; and the driving mechanism is configured to drive the detection module to switch between the first position and the second position.

6. The vehicle window assembly of claim 5, wherein the driving mechanism comprises a rail member and a support member, the rail member is configured to be mounted on the vehicle, the rail member has a first end and a second end opposite to the first end, and the first end is farther away from the detection module than the second end; the support member has one end rotatably connected to the detection module, and the other end that is rotatably connected to the rail member and slidable between the first end and the second end; and when the support member is close to the first end, the detection module is at the first position, and when the support member is close to the second end, the detection module is at the second position.

7. The vehicle window assembly of claim 6, wherein the driving mechanism further comprises a sliding block, the sliding block is connected to the rail member and slidable between the first end and the second end, and the support member is rotatably connected to the sliding block to be rotatably connected to the rail member through the sliding block to be slidable between the first end and the second end.

8. The vehicle window assembly of claim 6, wherein the detection module further comprises a cover plate and a bottom plate; the cover plate is connected to the light-transmitting plate, and the bottom plate has one end connected to one end of the light-transmitting plate away from the cover plate, and the other end connected to one end of the cover plate away from the light-transmitting plate; and the cover plate, the light-transmitting plate, and the bottom plate cooperatively define an accommodating space, the at least one sensor is accommodated in the accommodating space, the at least one sensor each has a sensing end facing the light-transmitting plate, and the bottom plate comprises a first bottom-plate and a second bottom-plate that are connected in a bent manner, one end of the first bottom-plate away from the second bottom-plate is connected to the light-transmitting plate, one end of the second bottom-plate away from the first bottom-plate is connected to the cover plate and is configured to be rotatably connectable to the vehicle, and one end of the second bottom-plate close to the first bottom-plate is rotatably connected to one end of the support member away from the rail member.

9. The vehicle window assembly of claim 8, wherein when the detection module is at the first position, the cover plate is parallel to the vehicle window glass, and when the detection module is at the second position, an angle $\beta$ between the cover plate and the vehicle window glass ranges from 20° to 45°.

10. The vehicle window assembly of claim 1, wherein when the detection apparatus is at the second position, an angle $\alpha$ between the vehicle window glass and the light-transmitting plate ranges from 60° to 150°.

11. The vehicle window assembly of claim 10, wherein the angle $\alpha$ between the vehicle window glass and the light-transmitting plate ranges from 90° to 120°.

12. The vehicle window assembly of claim 1, wherein when the detection apparatus is at the second position, an angle $\theta$ between the light-transmitting plate and the detection light emitted and/or received by the at least one sensor ranges from 60° to 120°.

13. The vehicle window assembly of claim 12, wherein when the detection apparatus is at the second position, the angle $\theta$ between the light-transmitting plate and the detection light emitted and/or received by the at least one sensor ranges from 70° to 110°.

14. The vehicle window assembly of claim 13, wherein when the detection apparatus is at the second position, the angle $\theta$ between the light-transmitting plate and the detection light emitted and/or received by the at least one sensor ranges from 80° to 100°.

15. The vehicle window assembly of claim 8, wherein the detection module further comprises a first sealing curtain and a second sealing curtain opposite to the first sealing curtain, and the first sealing curtain is connected to at least the cover plate, the light-transmitting plate, and a first edge-portion of the through opening close to the cover plate and the light-transmitting plate; the second sealing curtain is connected to at least the cover plate, the light-transmitting plate, and a second edge-portion of the through opening close to the cover plate and the light-transmitting plate; and the through opening is cooperatively sealed by the first sealing curtain, the second sealing curtain, the cover plate, and the light-transmitting plate to be configured to seal the vehicle when the detection module is at the second position.

16. The vehicle window assembly of claim 8, wherein the detection module further comprises a first sealing curtain, a second sealing curtain, a first sealing strip, and a second sealing strip, the first sealing curtain and the second sealing curtain are opposite to each other, and the first sealing curtain is connected to at least the cover plate, the light-transmitting plate, and the bottom plate; the second sealing curtain is connected to at least the cover plate, the light-transmitting plate, and the bottom plate, and the first sealing curtain, the second sealing curtain, the cover plate, the light-transmitting plate, and the bottom plate cooperatively define an enclosed space; the first sealing strip is disposed at a first edge-portion of the through opening and is close to the first sealing curtain; the second sealing strip is disposed at a second edge-portion of the through opening and is close to the second sealing curtain; and the first sealing strip and the second sealing strip are configured to seal the vehicle.

17. The vehicle window assembly of claim 8, wherein the cover plate comprises a first protrusion and a second protrusion, the first protrusion exceeds the light-transmitting plate in an extension direction of the cover plate, and the second protrusion exceeds the bottom plate in the extension direction of the cover plate; and the first protrusion is configured to seal a gap between the light-transmitting plate and the vehicle window glass when the detection module is at the first position, and the second protrusion is configured to seal a gap between the bottom plate and the vehicle.

18. The vehicle window assembly of claim 17, further comprising a first cushion and a second cushion; wherein the first cushion is disposed between the first protrusion and the vehicle window glass, and when the detection module is at the first position, the first cushion is configured to seal a gap between the cover plate and the vehicle window glass; and the second cushion is configured to be disposed between the second protrusion and the vehicle, and the second cushion is configured to seal a gap between the cover plate and the vehicle.

19. The vehicle window assembly of claim 18, further comprising a third cushion, wherein the third cushion is disposed at one side of the vehicle window glass close to the light-transmitting plate, and when the detection module is at the first position, the third cushion abuts against the first cushion to seal the gap between the cover plate and the vehicle window glass; and when the detection module is at the second position, the third cushion abuts against the end of the light-transmitting plate away from the cover plate to seal the gap between the light-transmitting plate and the vehicle window glass.

20. A vehicle comprising:

a vehicle body; and a vehicle window assembly, comprising:

vehicle window glass having a first surface and a second surface opposite to the first surface, wherein the first surface faces an interior of the vehicle, and the second surface faces an exterior of the vehicle, and the vehicle window glass further defines a through opening in communication with the first surface and the second surface; and a detection apparatus comprising a light-transmitting plate and at least one sensor, wherein the at least one sensor is configured to emit and/or receive detection light passing through the light-transmitting plate; the detection apparatus is disposed at the through opening, and one end of the detection apparatus away from the light-transmitting plate is rotatably connectable to the vehicle; and the detection apparatus has a first position and a second position, and the detection apparatus is rotatable between the first position and the second position; wherein when the detection apparatus is at the first position, the light-transmitting plate is located inside the vehicle; and when the detection apparatus is at the second position, the light-transmitting plate is located outside the vehicle, and the at least one sensor in the detection apparatus is configured to emit and/or receive the detection light passing through the light-transmitting plate to perform detection.

* * * * *